(12) United States Patent
Hsia

(10) Patent No.: US 11,283,291 B2
(45) Date of Patent: Mar. 22, 2022

(54) SOLID-STATE LIGHTING WITH ADAPTIVE EMERGENCY POWER

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 17/405,203

(22) Filed: Aug. 18, 2021

(65) Prior Publication Data

US 2021/0384760 A1   Dec. 9, 2021

Related U.S. Application Data

(63) Continuation-in-part of application No. 17/329,018, filed on May 24, 2021, which is a continuation-in-part of application No. 17/313,988, filed on May 6, 2021, which is a continuation-in-part of application No. 17/213,519, filed on Mar. 26, 2021, which is a continuation-in-part of application No. 17/151,606, filed on Jan. 18, 2021, which is a continuation-in-part of application No. 17/122,942, filed on Dec. 15, 2020, which is a continuation-in-part of application No. 17/099,450, filed on Nov. 16, 2020, which is a (Continued)

(51) Int. Cl.
| | |
|---|---|
| *H02J 1/10* | (2006.01) |
| *H02J 9/06* | (2006.01) |
| *H05B 45/14* | (2020.01) |
| *H05B 45/12* | (2020.01) |
| *H02J 7/04* | (2006.01) |

(52) U.S. Cl.
CPC .............. *H02J 9/065* (2013.01); *H02J 7/04* (2013.01); *H05B 45/12* (2020.01); *H05B 45/14* (2020.01)

(58) Field of Classification Search
CPC ...... H05B 47/18; H05B 45/355; H05B 47/19; H05B 45/12; H05B 45/14; H05B 45/30; H05B 45/38; H05B 45/00; H02J 7/04; H02J 9/065; Y02B 20/30
See application file for complete search history.

(56) References Cited

U.S. PATENT DOCUMENTS

| | | | |
|---|---|---|---|
| 5,661,645 A * | 8/1997 | Hochstein | H05B 45/3725 363/89 |
| 2013/0127362 A1 * | 5/2013 | Trainor | H02J 9/065 315/224 |

FOREIGN PATENT DOCUMENTS

WO    WO-2013090945 A1 *   6/2013   ........... H05B 45/385

* cited by examiner

*Primary Examiner* — Omar Rojas Cadima
(74) *Attorney, Agent, or Firm* — Han IP PLLC; Andy M. Han

(57) ABSTRACT

A light-emitting diode (LED) luminaire emergency driver comprises a rechargeable battery, a power supply unit, an LED driving circuit, a first control circuit, and a second control circuit. The LED driving circuit and the power supply unit each comprises a scalable power control scheme respectively configured to drive external LED arrays with different power levels when the alternate-current (AC) mains are unavailable and to power the first control circuit and to charge the rechargeable battery with different capacity when the AC mains are available. The second control circuit comprises two switches configured to control discharging and charging of the rechargeable battery. The second control circuit further comprises a relay switch circuit configured to control either a first LED driving current from the LED driving circuit or a second LED driving current from an external power supply unit to drive the external LED arrays without crosstalk.

16 Claims, 3 Drawing Sheets

Related U.S. Application Data continuation-in-part of application No. 17/076,748, filed on Oct. 21, 2020, which is a continuation-in-part of application No. 17/026,903, filed on Sep. 21, 2020, which is a continuation-in-part of application No. 17/016,296, filed on Sep. 9, 2020, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

SOLID-STATE LIGHTING WITH ADAPTIVE EMERGENCY POWER

CROSS-REFERENCE TO RELATED APPLICATIONS

The present disclosure is part of a continuation-in-part (CIP) application of U.S. patent application Ser. No. 17/329,018, filed 24 May 2021, which is part of CIP application of U.S. patent application Ser. No. 17/313,988, filed 6 May 2021, which is part of CIP application of U.S. patent application Ser. No. 17/213,519, filed 26 Mar. 2021, which is part of CIP application of U.S. patent application Ser. No. 17/151,606, filed 18 Jan. 2021, which is part of CIP application of U.S. patent application Ser. No. 17/122,942, filed 15 Dec. 2020, which is part of CIP application of U.S. patent application Ser. No. 17/099,450, filed 16 Nov. 2020, which is part of CIP application of U.S. patent application Ser. No. 17/076,748, filed 21 Oct. 2020, which is part of CIP application of U.S. patent application Ser. No. 17/026,903, filed 21 Sep. 2020, which is part of CIP application of U.S. patent application Ser. No. 17/016,296, filed 9 Sep. 2020, which is part of CIP application of U.S. patent application Ser. No. 16/989,016, filed 10 Aug. 2020, which is part of CIP application of U.S. patent application Ser. No. 16/929,540, filed 15 Jul. 2020, which is part of CIP application of U.S. patent application Ser. No. 16/904,206, filed 17 Jun. 2020 and issued as U.S. Pat. No. 11,102,864 on 24 Aug. 2021, which is part of CIP application of U.S. patent application Ser. No. 16/880,375, filed 21 May 2020, which is part of CIP application of U.S. patent application Ser. No. 16/861,137, filed 28 Apr. 2020 and issued as U.S. Pat. No. 10,992,161 on 27 Apr. 2021, which is part of CIP application of U.S. patent application Ser. No. 16/830,198, filed 25 Mar. 2020 and issued as U.S. Pat. No. 10,869,373 on 15 Dec. 2020, which is part of CIP application of U.S. patent application Ser. No. 16/735,410, filed 6 Jan. 2020 and issued as U.S. Pat. No. 10,660,179 on 19 May 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019 and issued as U.S. Pat. No. 10,959,310 on 23 Mar. 2021, which is part of CIP application of U.S. patent application Ser. No. 16/664,034, filed 25 Oct. 2019 and issued as U.S. Pat. No. 10,660,184 on 19 May 2020, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 19 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to a light-emitting diode (LED) emergency driver that includes feedback control circuits to adapt emergency power according to predetermined charging and discharging requirements of a rechargeable battery and to manage an LED driving current to operate external LED arrays.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with a luminaire emergency driver to be installed afterwards without operational uncertainties and hazards. This involves adaptive power management of an LED luminaire emergency driver.

SUMMARY

An LED luminaire emergency driver is used to add a functionality of a fluorescent or an LED lamp normally operated with alternate-current (AC) mains. The LED luminaire emergency driver comprises a rechargeable battery, at least one full-wave rectifier, a first power supply unit, an LED driving circuit, a first control circuit, and a second control circuit. The rechargeable battery comprises a high-potential electrode and a low-potential electrode with a terminal voltage across thereon. The first power supply unit comprises a control device, a first electronic switch, a transformer, a first ground reference, a second ground reference electrically coupled to the low-potential electrode, and a first feedback control circuit. The first power supply unit is coupled to the at least one full-wave rectifier and configured to convert the first DC voltage into a second DC voltage that powers the first control circuit and charges the terminal voltage of the rechargeable battery to reach a third DC voltage. The first control circuit comprises an emergency simulation control portion and is configured to regulate various charging and discharging conditions and to control switching between a normal mode when the line voltage is available and an emergency mode either when the line voltage is unavailable or during an emergency simulation. The first control circuit further comprises an indicator and a test portion. The emergency simulation control portion and the test portion are configured to perform a 30-second test once a month and a 90-minute test once a year in the emergency simulation, whereas the test portion is further configured to monitor the terminal voltage, duration of the emergency mode, and an operation of the external one or more LED arrays. The indicator is configured to show test results. The emergency simulation is initiated by the first control circuit to simulate a power outage according to predetermined test sequences.

The LED driving circuit comprises an input inductor, a logic control device, an electronic switch, at least one rectifier diode, an input capacitor, an output capacitor connected between the at least one rectifier diode and the low-potential electrode, and a second feedback control circuit. The second feedback control circuit is configured to receive the third DC voltage from the rechargeable battery and to convert the third DC voltage into a fourth DC voltage with a first LED driving current to power up external one or more LED arrays with a forward voltage across thereon when the line voltage is unavailable or during the emergency simulation.

The first feedback control circuit comprises an optocoupler circuit comprising an adjustable voltage reference diode and an optocoupler, whereas the optocoupler comprises an LED and a photo-transistor optically coupled to the LED. The LED is configured to receive the second DC voltage with an electric current flowing through the adjustable voltage reference diode, whereas the photo-transistor is configured to receive a light signal from the LED and to send an electric signal to the control device to control the second DC voltage according to a predetermined charging setting.

The first feedback control circuit further comprises a first trimming potentiometer coupled to the adjustable voltage reference diode and is configured to regulate a reference voltage, to control the electric current flowing through the LED, and to feedback the electric signal to the control device to turn the first electronic switch on and off, thereby regulating the second DC voltage and a charging current with a scalable output power for the rechargeable battery. The first feedback control circuit further comprises a first transistor coupled to the adjustable voltage reference diode and configured to pull down the reference voltage in response to a signal from the first control circuit and to shut down the first power supply unit during the emergency simulation. The first feedback control circuit further comprises a first diode, a second diode, and a first voltage divider coupled to an output of the first power supply unit. The first diode and the second diode are respectively coupled to the first voltage divider and the adjustable voltage reference diode, whereas cathodes of the first diode and the second diode are electrically connected with a first combined signal coupled to the first transistor. When the reference voltage is pulled down in response to the signal from the first control circuit, the output of the first power supply unit is simultaneously pulled down to expedite switching from the normal mode to the emergency mode.

The second feedback control circuit comprises a second voltage divider and a first operational amplifier following the second voltage divider. The second voltage divider is configured to take a proportion of the fourth DC voltage, whereas the first operational amplifier is configured to compare the proportion of the fourth DC voltage with a predetermined reference voltage and to send an output signal to the logic control device to adapt the fourth DC voltage to a level of the forward voltage during switching from the normal mode to the emergency mode. The second feedback control circuit further comprises a second operational amplifier and at least one combination of a resistor and a capacitor at an input port of the second operational amplifier. The second operational amplifier and the at least one combination of the resistor and the capacitor are configured to serve as a low-pass filter and to convert a pulse-width modulation (PWM) signal initiated by the first control circuit into a fifth DC voltage to control the logic control device, subsequently controlling the second electronic switch to turn on and off, thereby controlling the first LED driving current to power up the external one or more LED arrays. The fifth DC voltage comprises a voltage signal configured to turn off the second electronic switch, thereby shutting down the LED driving circuit when the line voltage becomes available from the emergency mode. The second feedback control circuit further comprises a second trimming potentiometer coupled to the first control circuit and configured to cause the first control circuit to regulate the first LED driving current at the scalable output power and to operate the external one or more LED arrays at different current levels. The second feedback control circuit further comprises a third diode coupled to a first output of the first operational amplifier with an electric current forward-biased to the third diode. The second feedback control circuit further comprises a resistor coupled to a second output of the second operational amplifier. Other electrical terminals of the third diode and the resistor are electrically connected with a second combined signal inputted to the logic control device to control the fourth DC voltage and the first LED driving current with a power setting adapted to the external one or more LED arrays when the line voltage is unavailable or during the emergency simulation.

The second control circuit comprises a relay switch circuit and is configured to relay the fourth DC voltage to the external one or more LED arrays to operate thereof either when the line voltage is unavailable or during the emergency simulation. The relay switch circuit comprises a coil configured to receive the terminal voltage to operate either when the line voltage is unavailable or during the emergency simulation. The relay switch circuit is further configured to couple either an output voltage from an external power supply unit or the fourth DC voltage to operate the external one or more LED arrays. The relay switch circuit further comprises a first input electrical terminal and an output electrical terminal respectively configured to receive the fourth DC voltage and to relay the fourth DC voltage to the external one or more LED arrays to operate thereon. The relay switch circuit further comprises a second input electrical terminal configured to relay the output voltage from the external power supply unit to the external one or more LED arrays to operate thereon. The second control circuit further comprises a first switch and a second switch, both coupled to an output of the first power supply unit and controlled by the first control circuit. The first switch, when turned on, is configured to apply the second DC voltage on the rechargeable battery for charging when the line voltage is available and to relay the terminal voltage to the output of the first power supply unit either when the line voltage is unavailable or during the emergency simulation. The second switch, when turned on, is configured to apply the terminal voltage to an input of the LED driving circuit to operate thereon. The second control circuit further comprises a second transistor and a third transistor respectively coupled to the first switch and the second switch and configured to receive pull-down signals from the first control circuit to individually turn the first switch and the second switch on and off to charge and discharge the rechargeable battery. The second control circuit further comprises a second power supply unit configured to convert either the second DC voltage from the first power supply unit or the terminal voltage into a sixth DC voltage respectively when the line voltage is available and when the line voltage is unavailable or during the emergency simulation. The six DC voltage is configured to continuously provide electric power to the first control circuit to operate thereon without a power interruption due to switching between the normal mode and the emergency mode.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "first", a "second", a "third", and so forth does not necessarily represent a part that is mentioned in an ordinal manner but represents a particular one.

DETAILED DESCRIPTION OF THE INVENTION

Figure 1:
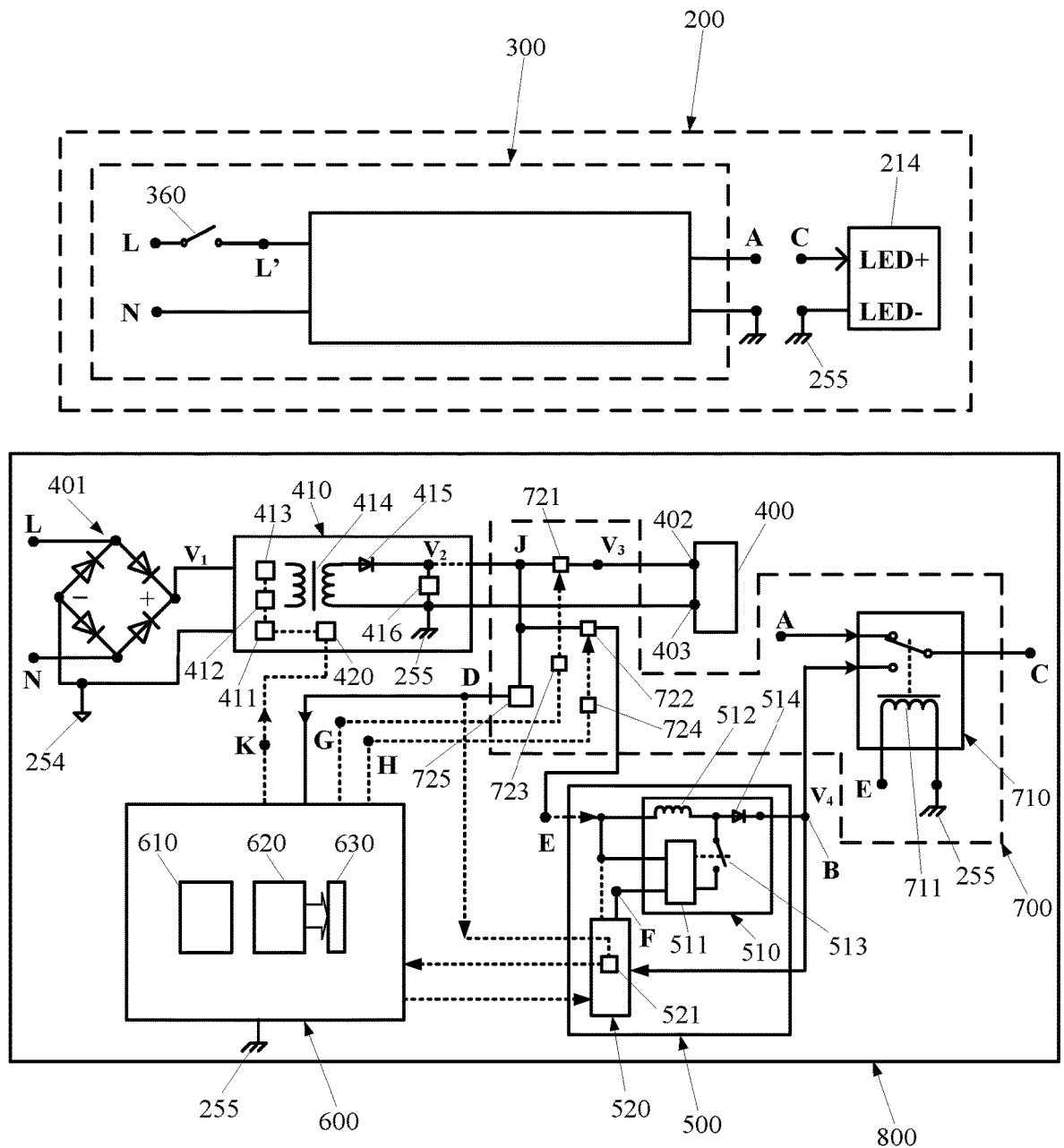
FIG. 1 is a block diagram of an LED luminaire emergency driver according to the present disclosure.

FIG. 1 is a block diagram of an LED luminaire emergency driver according to the present disclosure. The LED luminaire emergency driver 800 comprises an LED driving circuit 500 configured to provide an emergency power (i.e., a voltage and a current) to drive external one or more LED arrays 214 when a line voltage from alternate-current (AC) mains is unavailable. An external power supply unit 300 originally designed to receive the line voltage from the AC mains for general lighting applications is configured to operate in a normal mode to drive the external one or more LED arrays 214 as a part of an LED luminaire 200. The external power supply unit 300 comprises at least two electrical conductors "L'" and "N'". The at least two electrical conductors "L'" and "N'" are configured to couple to "L" and "N" in the LED luminaire emergency driver 800 via a power switch 360. The external one or more LED arrays 214 comprise a forward voltage thereon. The one or more LED arrays 214 comprises a first terminal LED+ and a second terminal LED− configured to receive an LED driving current from the first terminal LED+ and to return from the second terminal LED− to either the LED driving circuit 500 or the external power supply unit 300, depending on which one is an LED driving source.

In FIG. 1, the LED luminaire emergency driver 800 further comprises the at least two electrical conductors "L" and "N" configured to couple to the AC mains, a rechargeable battery 400, at least one full-wave rectifier 401, a first power supply unit 410, a first control circuit 600, and a second control circuit 700. The at least one full-wave rectifier 401 is coupled to the at least two electrical conductors "L" and "N" and configured to convert the line voltage into a first DC voltage. The rechargeable battery 400 comprises a high-potential electrode 402 and a low-potential electrode 403 with a terminal voltage across thereon. The first power supply unit 410 is an isolated step-down converter and comprises a first ground reference 254, a second ground reference 255 electrically isolated from the first ground reference 254, a transformer 414, a first feedback control circuit 420, a control device 411, a first electronic switch 412, and a diode 413. The first power supply unit 410 is coupled to the full-wave rectifier 401 and configured to convert the first DC voltage $V_1$ into a second DC voltage $V_2$ that provides electric power to the first control circuit 600 and to charge the terminal voltage of the rechargeable battery 400 to reach a third DC voltage $V_3$. The first feedback control circuit 420 is configured to monitor the second DC voltage and to regulate the control device 411 according to charging voltage and current requirements. The transformer 414 comprises a primary winding coupled to the first ground reference 254 and a secondary winding coupled to the second ground reference 255. The transformer 414 is configured to provide electrical isolation between the AC mains and the second DC voltage with respect to the second ground reference 255. In FIG. 1, the second ground reference 255 is electrically coupled to the low-potential electrode 403 to ease a charging current to flow into the rechargeable battery 400 and to return to the first power supply unit 410, completing a power transfer. The first power supply unit 410 further comprises a first rectifier diode 415 followed by a first capacitor 416 coupled between the first rectifier diode 415 and the second ground reference 255. The rectifier diode 415 and the first capacitor 416 are configured to build up the second DC voltage.

In FIG. 1, the first control circuit 600 is configured to regulate various charging and discharging conditions and to control switching between the normal mode when the line voltage is available and an emergency mode either when the line voltage is unavailable or during an emergency simulation. The first control circuit 600 comprises an emergency simulation control portion 610. The first control circuit 600 is configured to regulate various charging and discharging conditions and to control switching between a normal mode when the line voltage is available and an emergency mode either when the line voltage is unavailable or during an emergency simulation. The first control circuit 600 further comprises a test portion 620 and an indicator 630. The emergency simulation control portion 610 and the test portion 620 are configured to perform various self-diagnosis tests, including a 30-second test once a month and a 90-minute test once a year in the emergency simulation. The test portion 620 is further configured to monitor the terminal voltage, duration of the emergency mode, and an operation of the external one or more LED arrays 214. Test results are configured to delivered to the indicator 630 to display. When any problems are detected, the indicator 630 will flicker to show malfunctions. In FIG. 1, the first control circuit 600 is further configured to simulate a power outage according to predetermined test sequences. During such an emergency simulation, the first control circuit 600 starts to send multiple control signals to the first feedback control circuit 420 and the second feedback control circuit 520 to enable the LED driving circuit 500 and disable the first power supply unit 410. For example, the first control circuit 600 initiates a signal via a port "K" to the first feedback control circuit 420 to inactivate the first power supply unit 410.

In FIG. 1, the second control circuit 700 comprises a relay switch circuit 710 and is configured to relay the fourth DC voltage to the external one or more LED arrays 214 to operate thereof either when the line voltage is unavailable or during the emergency simulation. The relay switch circuit 710 comprises a coil 711 configured to receive the terminal voltage from an "E" port to operate either when the line voltage is unavailable or during the emergency simulation. The relay switch circuit 710 is further configured to couple either an output voltage at an "A" port from an external power supply unit 300 or the fourth DC voltage to operate the external one or more LED arrays 214. The relay switch circuit 710 further comprises a first input electrical terminal "B" and an output electrical terminal "C" respectively configured to receive the fourth DC voltage and to relay the fourth DC voltage to the external one or more LED arrays 214 to operate thereon. The relay switch circuit 710 further comprises a second input electrical terminal "A" (i.e. the "A" port) configured to relay the output voltage from the external power supply unit 300 to the external one or more LED arrays 214 via the output electrical terminal "C" to operate thereon when the line voltage is available.

In FIG. 1, the second control circuit 700 further comprises a first switch 721 and a second switch 722, both coupled to an output "J" of the first power supply unit 410 and controlled by the first control circuit 600, The first switch 721, when turned on, is configured to apply the second DC voltage on the rechargeable battery 400 for charging when the line voltage is available and to relay the terminal voltage to the output "J" of the first power supply unit 410 either when the line voltage is unavailable or during the emergency simulation. The second switch 722, when turned on, is configured to apply the terminal voltage to an input (i.e. the "E" port) of the LED driving circuit 500 to operate thereon. The terminal voltage is also applied to the coil 711 to operate the relay switch circuit 710. In other words, the relay switch circuit 710 is normally on for the external power supply unit 300 but normally off for the fourth DC voltage. The second control circuit 700 further comprises a second transistor 723 and a third transistor 724 respectively coupled to the first switch 721 and the second switch 722 and configured to receive pull-down signals from the first control circuit 600 to individually turn the first switch 721 via a "G" port and the second switch 722 via a "H" port on and off in processes of charging and discharging the rechargeable battery 400. The second control circuit 700 further comprises a second power supply unit 725, which is a low-dropout linear regulator and can provide a fixed output voltage as long as input voltages are in a range of rated values. The second power supply unit 725 is, therefore, configured to convert either the second DC voltage from the first power supply unit 410 or the terminal voltage into a sixth DC voltage respectively when the line voltage is available and when the line voltage is unavailable or during the emergency simulation. The sixth DC voltage appeared at a port "D" is configured to continuously provide electric power to the first control circuit 600 to operate thereon without a momentary power loss or a power interruption due to switching between the normal mode and the emergency mode.

In FIG. 1, the LED driving circuit 500 comprises a step-up converter 510 and a second feedback control circuit 520 and is configured to receive the third DC voltage from the rechargeable battery 400 via the "E" port and to convert the third DC voltage into a fourth DC voltage with a first LED driving current to power up the external one or more LED arrays 214 via the relay switch circuit 710 (i.e. the port "B" and the port "C") when the line voltage is unavailable or during an emergency simulation. The second feedback control circuit 520 comprises a second trimming potentiometer 521 coupled to the first control circuit 600 and configured to label an output power level in the first control circuit 600 to control the second feedback control circuit 520 to regulate the first LED driving current at a scalable output power and to operate the external one or more LED arrays 214 at different current levels without redesigning a new LED driving circuit compatible to the external one or more LED arrays 214. In FIG. 1, the step-up converter 510 comprises a logic control device 511, an input inductor 512, a second electronic switch 513, and a second rectifier diode 514. The LED driving circuit 500 is configured to boost the third DC voltage to a fourth DC voltage at the port "B" with respect to the second ground reference 255. The logic control device 511 is configured to receive a feedback signal from the second feedback control circuit 520 via a port "F" to regulate a first LED driving current at the scalable output power and to control the second electronic switch 513 on and off. The second electronic switch 513 comprises either a metal-oxide-semiconductor field-effect transistor (MOSFET) or a bipolar junction transistor (BJT). The LED driving circuit 500 is configured to couple to the third DC voltage via the port "E" from the second control circuit 700 and further from the rechargeable battery 400 via a discharging process when the line voltage is unavailable or during an emergency simulation.

Figure 2:
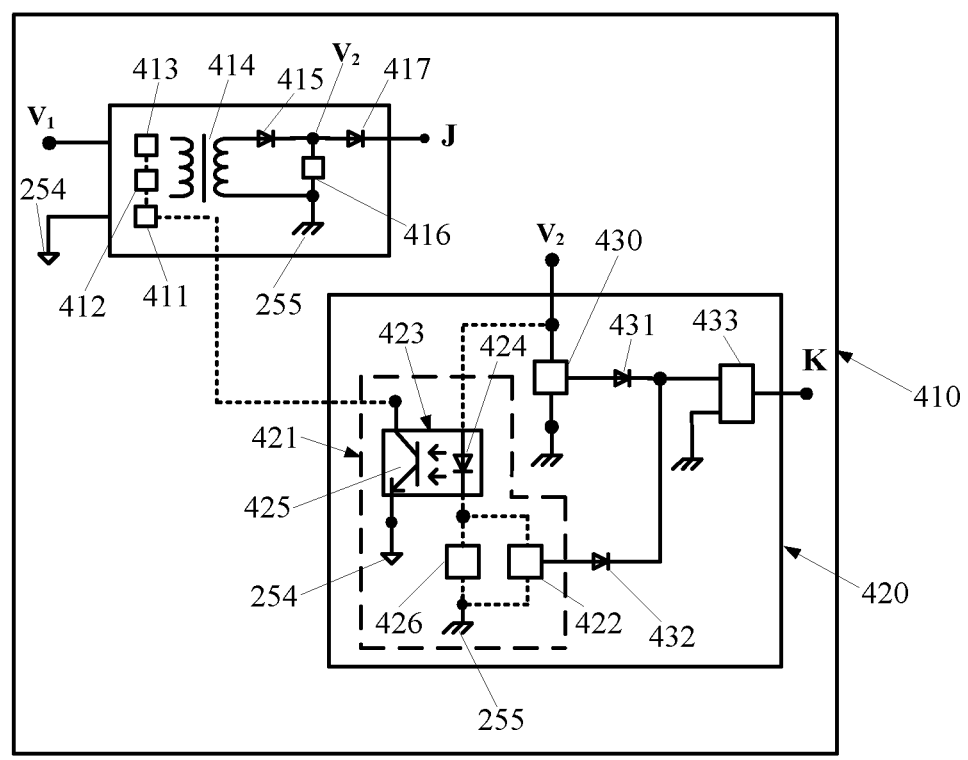
FIG. 2 is a block diagram of a first power supply unit according to the present disclosure.

FIG. 2 is a block diagram of a first power supply unit according to the present disclosure. As depicted in FIG. 1, the first power supply unit 410 is the isolated step-down converter and comprises the first ground reference 254, the second ground reference 255 electrically isolated from the first ground reference 254, the transformer 414, the first feedback control circuit 420, the control device 411, the first electronic switch 412, and the diode 413. The first power supply unit 410 is coupled to the full-wave rectifier 401 and configured to convert the first DC voltage into a second DC voltage that powers the first control circuit 600 and charges the terminal voltage of the rechargeable battery 400 to reach a third DC voltage. The first feedback control circuit 420 is configured to monitor the second DC voltage and to regulate the control device 411 according to charging voltage and current requirements. The transformer 414 comprises a primary winding coupled to the first ground reference 254 and a secondary winding coupled to the second ground reference 255. The transformer 414 is configured to provide electrical isolation between the AC mains and the second DC voltage with respect to the second ground reference 255. In FIG. 1, the second ground reference 255 is electrically coupled to the low-potential electrode 403 to ease a charging current to flow into the rechargeable battery 400 and to return to the first power supply unit 410, completing the power transfer. In FIG. 2, the first feedback control circuit 420 comprises an optocoupler circuit 421 comprising an adjustable voltage reference diode 422 and an optocoupler 423. The optocoupler 423 comprises an LED 424 and a photo-transistor 425 optically coupled to the LED 424 configured to receive the second DC voltage with an electric current flowing through the adjustable voltage reference diode 422, whereas the photo-transistor 425 is configured to receive a light signal from the LED 424 and to send an electric signal to the control device 411 to control the second DC voltage. The first feedback control circuit 420 further comprises a first trimming potentiometer 426 coupled to the adjustable voltage reference diode 422 and is configured to regulate a reference voltage, to control the electric current flowing through the LED 424, and to feedback the electric signal to the control device 411 to turn the first electronic switch 412 on and off, thereby regulating the second DC voltage and a charging current with the scalable output power for the rechargeable battery 400 without changing the first power supply unit 410 for other charging power settings. In other words, the first trimming potentiometer 426 makes such charging power settings possible.

In FIG. 2, the secondary winding of the transformer 414 is coupled to the first rectifier diode 415 followed by the first capacitor 416 coupled between the first rectifier diode 415 and the second ground reference 255. The first rectifier diode 415 and the first capacitor 416 are configured to build up the second DC voltage. The first power supply unit 410 further comprises a charging current controlled diode 417 coupled between the first rectifier diode 415 and the first switch 721 (i.e. the output "J" of the first power supply unit 410) and configured to block a current flow from the rechargeable battery 400 to charge the first capacitor 416 when the line voltage is unavailable or during an emergency simulation. The first feedback control circuit 420 further comprises a first voltage divider 430, a first diode 431, a second diode 432, and a first transistor 433. The first transistor 433 is coupled to the adjustable voltage reference diode 422 via the second diode 432 and configured to pull down the reference voltage in response to a signal from the first control circuit 600 via the port "K" to the first feedback control circuit 420 to shut down the first power supply unit 410 during the emergency simulation. The first voltage divider 430 is coupled to the first rectifier diode 415, where the second DC voltage $V_2$ appears. The first diode 431 and the second diode 432 are respectively coupled to the first voltage divider 430 and the adjustable voltage reference diode 422, whereas cathodes of the first diode 431 and the second diode 432 are electrically connected with a first combined signal coupled to the first transistor 433. When the reference voltage is pulled down in response to the signal from the first control circuit 600, the output of the first power supply unit 410 is simultaneously pulled down to expedite switching from the normal mode to the emergency mode.

Figure 3:
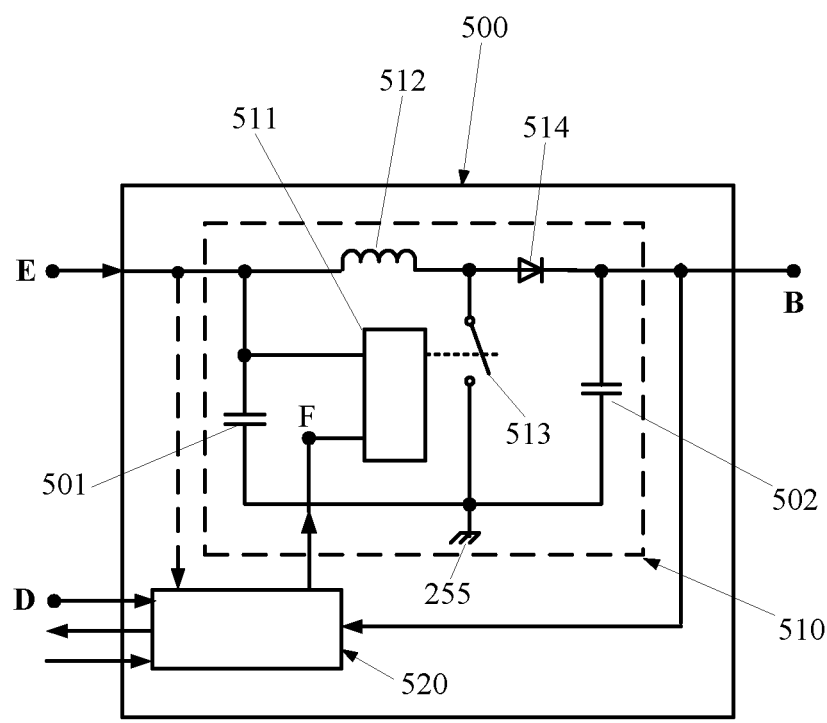
FIG. 3 is a block diagram of an LED driving circuit according to the present disclosure.

FIG. 3 is a block diagram of an LED driving circuit according to the present disclosure. As depicted in FIG. 1, the LED driving circuit 500 comprises the step-up converter 510 and the second feedback control circuit 520 and is configured to receive the third DC voltage from the rechargeable battery 400 via the "E" port and to convert the third DC voltage into a fourth DC voltage with a first LED driving current to power up the external one or more LED arrays 214 via the relay switch circuit 710 (i.e. the port "B" and the port "C") when the line voltage is unavailable or during the emergency simulation. In FIG. 3, the step-up converter 510 comprises the logic control device 511, the input inductor 512, the second electronic switch 513, the second rectifier diode 514, an input capacitor 501, and an output capacitor 502 connected between the second rectifier diode 514 and the low-potential electrode 403, which is common to the second voltage reference 255. The input capacitor 501 and the output capacitor 502 are configured to help build up the fourth DC voltage, which is greater than the input voltage $V_3$, and to filter out unwanted voltage noises generated by the second electronic switch 513 due to high frequency switching. The fourth DC voltage appears at the port "B". The logic control device 511 is configured to receive a feedback signal from the second feedback control circuit 520 via the port "F" to regulate the first LED driving current at the scalable output power and to control the second electronic switch 513 on and off. The second electronic switch 513 comprises either an MOSFET or a BJT. The LED driving circuit 500 is configured to couple to the third DC voltage via the port "E" from the second control circuit 700 and further from the rechargeable battery 400 via a discharging process when the line voltage is unavailable or during an emergency simulation.

Figure 4:
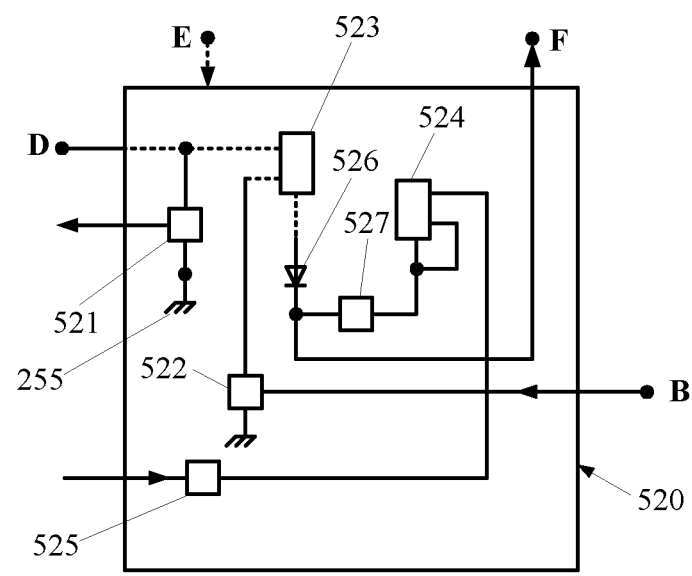
FIG. 4 is a block diagram of a second feedback control circuit according to the present disclosure.

FIG. 4 is a block diagram of a second feedback control circuit according to the present disclosure. The second feedback control circuit 520 comprises a second trimming potentiometer 521 coupled to the first control circuit 600 and configured to label an output power level to control the second feedback control circuit 520 and to regulate the first LED driving current at the scalable output power and to operate the external one or more LED arrays 214 at different current levels without redesigning a new LED driving circuit compatible to the external one or more LED arrays 214.

In FIG. 4, the second feedback control circuit 520 further comprises a second voltage divider 522 and a first operational amplifier 523 following the second voltage divider 522. The second voltage divider 522 is configured to take a proportion of the fourth DC voltage, whereas the first operational amplifier 523 is configured to compare the proportion of the fourth DC voltage with a predetermined reference voltage, which is the output voltage from the second power supply unit 725 at the port "D". The first operational amplifier 523 is also configured to send an output signal to the logic control device 511 to adapt the fourth DC voltage to a level of the forward voltage. It should be noted that the fourth DC voltage is clamped to the forward voltage when the fourth DC voltage is applied to the external one or more LED arrays 214. However, the second feedback control circuit 520 can detect a voltage mismatch between the two and pull down the fourth DC voltage to a level of the forward voltage.

In FIG. 4, the second feedback control circuit 520 further comprises a second operational amplifier 524 and at least one combination of a resistor and a capacitor 525 at an input port of the second operational amplifier 524. The second operational amplifier 524 and the at least one combination of the resistor and the capacitor 525 are configured to serve as a low-pass filter and to convert a pulse-width modulation (PWM) signal initiated by the first control circuit 600 into a fifth DC voltage to control the logic control device 511, subsequently controlling the second electronic switch 513 to turn on and off, thereby controlling the first LED driving current to power up the external one or more LED arrays 214. The fifth DC voltage comprises a voltage signal configured to turn off the second electronic switch 513 (in FIG. 3), thereby shutting down the LED driving circuit 500 when the line voltage becomes available from the emergency mode. The at least one combination of a resistor and a capacitor 525 may comprise two combinations of the resistor and the capacitor, cascaded side-by-side. The second feedback control circuit 520 further comprises a third diode 526 coupled to a first output of the first operational amplifier 523 with an electric current forward-biased to the third diode 526. The second feedback control circuit further comprises a resistor 527 coupled to a second output of the second operational amplifier 524, whereas the other ends of the third diode 526 and the resistor 527 are electrically connected with a second combined signal inputted to the logic control device 511 (in FIG. 3) to control the fourth DC voltage and the first LED driving current with adaptive power settings to the external one or more LED arrays 214 when the line voltage is unavailable or during the emergency simulation. In other words, the second feedback control circuit 520 is configured to take the proportion of the fourth DC voltage $V_4$ and the PWM signal to control the fourth DC voltage $V_4$.

Whereas preferred embodiments of the present disclosure have been shown and described, it will be realized that alterations, modifications, and improvements may be made thereto without departing from the scope of the following claims. Another kind of schemes with an LED luminaire emergency driver adopted in an LED luminaire to operate the LED luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire emergency driver, comprising:
   at least two electrical conductors configured to couple to alternate-current (AC) mains;
   a rechargeable battery comprising a high-potential electrode and a low-potential electrode with a terminal voltage across thereon;

at least one full-wave rectifier coupled to the at least two electrical conductors and configured to convert a line voltage from the AC mains into a first direct-current (DC) voltage;

a first control circuit comprising an emergency simulation control portion, the first control circuit configured to regulate various charging and discharging conditions and to control switching between a normal mode when the line voltage is available and an emergency mode either when the line voltage is unavailable or during an emergency simulation;

a first power supply unit comprising a control device, a first electronic switch, a transformer, a first ground reference, a second ground reference electrically coupled to the low-potential electrode, and a first feedback control circuit, the first power supply unit coupled to the at least one full-wave rectifier and configured to convert the first DC voltage into a second DC voltage that powers the first control circuit and charges the terminal voltage of the rechargeable battery to reach a third DC voltage;

an LED driving circuit comprising an input inductor, a logic control device, a second electronic switch, a rectifier diode, an input capacitor, an output capacitor connected between the rectifier diode and the low-potential electrode, and a second feedback control circuit, the LED driving circuit configured to receive the third DC voltage from the rechargeable battery and to convert the third DC voltage into a fourth DC voltage with a first LED driving current to power up external one or more LED arrays with a forward voltage across thereon when the line voltage is unavailable or during the emergency simulation; and a second control circuit comprising a relay switch circuit, the second control circuit configured to relay the fourth DC voltage to the external one or more LED arrays to operate thereof either when the line voltage is unavailable or during the emergency simulation, wherein:
  the first feedback control circuit comprises an optocoupler circuit comprising an adjustable voltage reference diode and an optocoupler, wherein the optocoupler comprises an LED and a photo-transistor optically coupled to the LED, wherein the LED is configured to receive the second DC voltage with an electric current flowing through the adjustable voltage reference diode, and wherein the photo-transistor is configured to receive a light signal from the LED and to send an electric signal to the control device to control the second DC voltage according to a predetermined charging setting; and
  the emergency simulation is initiated by the first control circuit to simulate a power outage according to predetermined test sequences.

2. The LED luminaire emergency driver of claim 1, wherein the first feedback control circuit further comprises a first trimming potentiometer coupled to the adjustable voltage reference diode and is configured to regulate a reference voltage, to control the electric current flowing through the LED, and to feedback the electric signal to the control device to turn the first electronic switch on and off, thereby regulating the second DC voltage and a charging current with a scalable output power for the rechargeable battery.

3. The LED luminaire emergency driver of claim 2, wherein the first feedback control circuit further comprises a first transistor coupled to the adjustable voltage reference diode and configured to pull down the reference voltage in response to a signal from the first control circuit and to shut down the first power supply unit during the emergency simulation.

4. The LED luminaire emergency driver of claim 3, wherein the first feedback control circuit further comprises a first diode, a second diode, and a first voltage divider coupled to an output of the first power supply unit, with the first diode and the second diode respectively coupled to the first voltage divider and the adjustable voltage reference diode, wherein cathodes of the first diode and the second diode are electrically connected with a first combined signal coupled to the first transistor, and wherein, when the reference voltage is pulled down in response to the signal from the first control circuit, the output of the first power supply unit is simultaneously pulled down to expedite switching from the normal mode to the emergency mode.

5. The LED luminaire emergency driver of claim 1, wherein the second feedback control circuit comprises a second voltage divider and a first operational amplifier following the second voltage divider, wherein the second voltage divider is configured to take a proportion of the fourth DC voltage, wherein the first operational amplifier is configured to compare the proportion of the fourth DC voltage with a predetermined reference voltage and to send an output signal to the logic control device to adapt the fourth DC voltage to a level of the forward voltage during switching from the normal mode to the emergency mode.

6. The LED luminaire emergency driver of claim 5, wherein the second feedback control circuit further comprises a second operational amplifier and at least one combination of a resistor and a capacitor at an input port of the second operational amplifier, wherein the second operational amplifier and the at least one combination of the resistor and the capacitor are configured to serve as a low-pass filter and to convert a pulse-width modulation (PWM) signal initiated by the first control circuit into a fifth DC voltage to control the logic control device, subsequently controlling the second electronic switch to turn on and off, thereby controlling the first LED driving current to power up the external one or more LED arrays.

7. The LED luminaire emergency driver of claim 6, wherein the fifth DC voltage comprises a voltage signal configured to turn off the second electronic switch, thereby shutting down the LED driving circuit when the line voltage becomes available from the emergency mode.

8. The LED luminaire emergency driver of claim 7, wherein the second feedback control circuit further comprises a second trimming potentiometer coupled to the first control circuit and configured to cause the first control circuit to regulate the first LED driving current at a scalable output power and to operate the external one or more LED arrays at different current levels.

9. The LED luminaire emergency driver of claim 6, wherein the second feedback control circuit further comprises a third diode coupled to a first output of the first operational amplifier with an electric current forward-biased to the third diode, wherein the second feedback control circuit further comprises a resistor coupled to a second output of the second operational amplifier, and wherein other electrical terminals of the third diode and the resistor are electrically connected with a second combined signal inputted to the logic control device to control the fourth DC voltage and the first LED driving current with a power setting adapted to the external one or more LED arrays when the line voltage is unavailable or during the emergency simulation.

10. The LED luminaire emergency driver of claim 1, wherein the relay switch circuit comprises a coil configured to receive the terminal voltage to operate either when the line voltage is unavailable or during the emergency simulation, and wherein the relay switch circuit is further configured to couple either an output voltage from an external power supply unit or the fourth DC voltage to operate the external one or more LED arrays.

11. The LED luminaire emergency driver of claim 10, wherein the relay switch circuit further comprises a first input electrical terminal and an output electrical terminal respectively configured to receive the fourth DC voltage and to relay the fourth DC voltage to the external one or more LED arrays to operate thereon.

12. The LED luminaire emergency driver of claim 11, wherein the relay switch circuit further comprises a second input electrical terminal configured to relay the output voltage from the external power supply unit to the external one or more LED arrays to operate thereon.

13. The LED luminaire emergency driver of claim 1, wherein the second control circuit further comprises a first switch and a second switch, both coupled to an output of the first power supply unit and controlled by the first control circuit, wherein the first switch, when turned on, is configured to apply the second DC voltage on the rechargeable battery for charging when the line voltage is available and to relay the terminal voltage to the output of the first power supply unit either when the line voltage is unavailable or during the emergency simulation, and wherein the second switch, when turned on, is configured to apply the terminal voltage to an input of the LED driving circuit to operate thereon.

14. The LED luminaire emergency driver of claim 13, wherein the second control circuit further comprises a second transistor and a third transistor respectively coupled to the first switch and the second switch and configured to receive pull-down signals from the first control circuit to individually turn the first switch and the second switch on and off to charge and discharge the rechargeable battery.

15. The LED luminaire emergency driver of claim 14, wherein the second control circuit further comprises a second power supply unit configured to convert either the second DC voltage from the first power supply unit or the terminal voltage into a sixth DC voltage respectively when the line voltage is available and when the line voltage is unavailable or during the emergency simulation, and wherein the six DC voltage is configured to continuously provide electric power to the first control circuit to operate thereon without a power interruption due to switching between the normal mode and the emergency mode.

16. The LED luminaire emergency driver of claim 1, wherein the first control circuit further comprises an indicator and a test portion, wherein the emergency simulation control portion and the test portion are configured to perform a 30-second test once a month and a 90-minute test once a year in the emergency simulation, wherein the test portion is further configured to monitor the terminal voltage, duration of the emergency mode, and an operation of the external one or more LED arrays, and wherein the indicator is configured to show test results.

\* \* \* \* \*